May 13, 1969  F. W. STORM VAN LEEUWEN  3,444,019
METHOD FOR THE MANUFACTURE OF REINFORCED PLASTIC PIPES
Filed Feb. 3, 1964
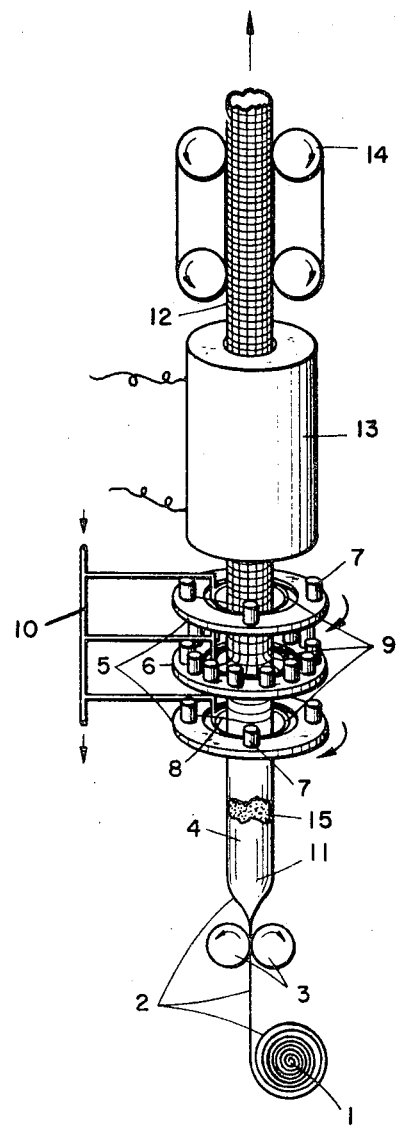
INVENTOR:
FREDERIK W. STORM VAN LEEUWEN
BY: *James H. Parker.*
  HIS ATTORNEY United States Patent Office 3,444,019
Patented May 13, 1969

3,444,019
METHOD FOR THE MANUFACTURE OF REINFORCED PLASTIC PIPES
Frederik W. Storm van Leeuwen, Delft, Netherlands, assignor to Shell Oil Company, New York, N.Y., a corporation of Delaware
Filed Feb. 3, 1964, Ser. No. 341,933
Claims priority, application Netherlands, Feb. 8, 1963, 288,716
Int. Cl. B65h 81/04; B65c 3/26; B29c 17/02
U.S. Cl. 156—156                                  5 Claims This invention relates to a method for the manufacture of plastic pipes. More particularly, the invention provides a method for the manufacture of glass-reinforced resin pipes.

In certain cases it is desirable to have available plastic pipes provided with an inner coating or lining. The lining may, for example, serve as a waterproof layer if the pipe itself is not waterproof, or as a smooth coating for reducing the flow-resistance in the pipe or for preventing depositions in the pipe if the latter itself has a rough inner wall. Alternatively, such a lining may serve to protect the pipe against corrosion by the liquid to be transported through the pipe.

Generally, the manufacture of such plastic pipes is effected by forming said pipes or tubes around a core or mandrel of steel or other metal. In this manufacturing technique it is the practice to use a fixedly mounted mandrel, from which the pipe must be removed after it has been formed. Since the pipe tends to stick to the mandrel, removal is often attended with difficulties or even damage, and the surface of the mandrel must, before each pipe is formed, be coated with an agent which prevents adhesion of the pipe.

It is therefore the primary object of the present invention to provide a simple method for the manufacture of reinforced plastic pipes with a thin-walled lining wherein a core or mandrel is obviated. In other words, such drawbacks are avoided because the plastic pipe manufactured by the present method is formed around a tubular film from which the plastic pipe need not be subsequently removed. Another object of the present invention is to provide a continuous and rapid manufacture of plastic pipes, particularly glass reinforced plastic pipes having an inner coating or lining. Still other objects will become apparent to those skilled in the art from the following disclosure and accompanying drawing.

These and other objects may be accomplished by a method for the continuous manufacture of reinforced plastic pipes which comprises moving a tubular film vertically upwards, during which movement said tubular film is closed at a fixed point relative to the surroundings and filled above that point over at least a part of the path to be traversed by the tubular film with a non-cohesive weighting material, and applying a plastic material, with or without glass reinforcing fibers, to the outside of the filled portion of the tubular film in such a way that a tubular pipe is formed around said film.

Before being filled with weighting material, the tubular film preferably has the shape of a flat tube so that film can be fed from a supply reel.

The method according to the invention is particularly suitable for the manufacture of pipes composed of threads. Such pipes often have the disadvantage that even at pressures far below the bursting pressure the liquid flowing through the pipe "sweets" through the wall of the pipe. According to the invention these pipes may, in a simple manner, be provided with a waterproof lining.

One embodiment of the invention employing glass fiber reinforcement will now be described by way of example with reference to the accompanying drawing which represents a single perspective view of the apparatus.

Referring to the drawing, a film 2 of plasticized polyvinyl chloride with a thickness of, for example, 0.35 mm. is wound in the shape of a flat tube around a supply reel 1. The outside of the film 2 has a layer of adhesive, for example, a type of glue based on a mixture of acrylonitrile, butadiene rubber, polyvinyl chloride and polyvinyl alcohol. The flat, tubular film 2 is passed between rollers 3, on which forces are exerted which are radially directed towards each other, so that the film 2 is nipped between the rollers 3. Above the rollers 3, the film 2 is filled with a non-cohesive weighting material 15, as a result of which the film 2 there forms a circular cylindrical film part 4. The weighting material 15 may be a liquid, as for example, water or glycerine, or a solid, powdery or granular substance, as for example, sand. During the vertical upward movement of the circular cylindrical film part 4 the weighting material 15 contained therein will, as a whole, remain in the same position relative to the surroundings, so that the film part 4 is invariably filled with weighting material 15 to the desired height above the rollers 3. Since the bottom of the circular cylindrical film part 4 is closed by the rollers 3, the weighting material 15 cannot run out at the bottom of the film part 4.

A number of axially spread annular tables 5, 6, are fitted concentrically around the film part 4 filled with weighting material 15. On each table 5, 6, there are a number of bobbins 7, on which glass-fiber thread 8 is wound. Between each table 5, 6, and the film part 4 there is an annular tray 9 filled with hardenable synthetic resin in the liquid state. From each bobbin 7 a glass-fiber thread 8 runs to the outside of the film part 4. Between the bobbins 7 and the film part 4 the threads 8 are passed through one of the trays 9 filled with resin, as a result of which the threads 8 become impregnated with resin. The trays 9 are connected to a pipe system 10 through which fresh resin can be supplied in order to replenish the trays 9 as the resin is consumed. In this particular case the resin consists of a mixture of an epoxy resin and a curing agent, which mixture can be hardened by means of heating. The bottom and top tables 5 may be rotated round the film part 4 by means of a driving mechanism which is not shown. The middle table 6 is stationary. The glass-fiber threads 8 impregnated with liquid resin are laid around and along the outside of the film part 4 by the relative movement of the film part 4 and the tables 5, 6. Threads from the stationary tables 6 are laid axially along the film part 4, and threads from the two rotating tables 5 are wound helically round the film part 4. As a result of the layer of adhesive on the film, the threads 8 are firmly secured to the film part 4. The number and the position of the bobbins 7, as well as the relative movement of the tables 5, 6, and the film part 4, are so selected that the threads 8 form a cohesive whole, i.e., the actual plastic pipe 12, around the film part 4. The circular cylindrical film part 4 is filled with weighting material 15 to at least such a height that the film part 4 offers sufficient resistance to be subjected to the application of the threads 8 around its circumference without change of shape. On the other hand, the height of the filling should remain below the level at which the film part 4 would locally be permanently stretched and thereby lose its cylindrical shape. This danger can be reduced by already beginning to wind the glass-fiber threads 8 round the film at the very first point where the film 2, after having passed through the rollers 3, assumes a circular cross-section, indicated in the drawing by 11.

The still soft, plastic pipe 12 so formed is then passed through an electric oven 13, in which the resin is hardened by heating.

Until it has been hardened it may be necessary to support the pipe 12 in such a way that it retains its circular cross-section. This support can be effected by allowing the column of weighting material in the film 2 to extend into the oven 13. If it is not possible to apply this method of support, as for example, because the hydrostatic pressure at the lowest point of the filled film part 4 would become too great, or because the weighting material would become overheated, a slight underpressure may be created in the oven 13 outside the pipe 12 in order to keep the pipe 12 in the desired shape. In order to maintain this under pressure in the oven 13, the pipe 12 passes a suitable sealing means on entering and leaving the oven 13.

When it leaves the oven 13, the plastic pipe 12 has become a firm whole, so that a hauling device 14 can grip it and pass it upwards. The pipe 12 lined with the film 2 may be cut into sections of the desired length by a cutting device not shown in the drawing, or may be further worked in any other suitable way.

The liquid resins which are suitable for use in the present method include, among others, polyester, polyether, polyepoxy, polyurethane, phenol-aldehyde, urea-formaldehyde, melamine-formaldehyde resins and mixtures thereof. Suitable polyester resins (alkyd) are described in "The Chemistry of Synthetic Resins," Carleton Ellis, chapters 42–49, Reinhold Publishing Company (1935). The preparation of operable polyether and polyepoxy resins are described in "Epoxy Resins," Lee and Neville, McGraw-Hill Book Company (1957) and in United States Patent No. 2,633,458, issued Mar. 31, 1953, to Shokal. The preparation and properties of suitable phenol aldehyde and ureaformaldehyde resins can be found in "The Chemistry of Synthetic Resins," chapters 13–22 and 26–32. Information on suitable polyurethanes can be found in "Polyurethanes, Chemistry and Technology," Saunders and Frisch, John Wiley and Sons (1962).

Curing agents which are suitable for use in the present invention are, in general, discussed in the above-noted sources in conjunction with the respective resins.

It was found that the present method is particularly suitable for preparing reinforced plastic pipe when glass roving fibers are impregnated with an impregnating fluid comprising a polyepoxide resin (Polyether A of Shokal, U.S. Patent No. 2,633,458, issued Mar. 31, 1953) and an aliphatic amine such as diethylene triamine. Other suitable polyepoxide curing agents include carboxylic acids, carboxylic acid anhydrides and mixtures thereof. Related runs were made with other resins, including polyurethanes, phenol-formaldehyde and alkyd resins. In every instance, suitable glass-reinforced resin pipes were continually produced without the aid of a core or mandrel.

I claim as my invention:

1. A method for the continuous manufacture of plastic pipes comprising moving a tubular film vertically upwards, closing the tubular film at the lower end portion thereof, filling said film between the bottom closed end portion thereof and the upper open end portion thereof with a non-cohesive filling material, and applying a plastic material to the outside of the filled film at the point where the expanded tubular film assumes a circular cross-section to form a layer thereon of a preselected thickness.

2. A method for the continuous manufacture of plastic pipes comprising moving a tubular film vertically upwards, closing the tubular film at the lower end portion thereof, filling said closed film portion over at least a part of the path to be traversed by the tubular film with a non-cohesive weighting material, and applying threads impregnated with a hardenable synthetic resin around the tubular film, at the point of circular cross-section of the expanded tubular film which resin is subsequently hardened.

3. A method according to claim 2 wherein the threads impregnated with a hardenable synthetic resin are laid around and longitudinally along the outside of the film by the relative movement of said film at the lowest point of circular cross-section of the filled portion of said tubular film.

4. A method according to claim 2 wherein the film before being filled with weighting material has the form of a flat tube and is fed from a supply reel.

5. A method according to claim 2 wherein the threads impregnated with a hardenable resin consist of glass-fiber threads impregnated with a polyepoxide resin and the film consists of a plasticized polyvinyl chloride film coated with an adhesive.

References Cited

UNITED STATES PATENTS

| | | | |
|---|---|---|---|
| 2,454,719 | 11/1948 | Scogland | 156—155 |
| 2,519,036 | 8/1950 | Ford et al. | 156—189 |
| 3,068,134 | 12/1962 | Cilker et al. | 156—172 |
| 3,234,309 | 2/1966 | Graff | 156—156 |

EARL M. BERGERT, *Primary Examiner.*

D. J. FRITSCH, *Assistant Examiner.*

U.S. Cl. X.R.

156—172, 287